US006611661B2

United States Patent
Buck

(10) Patent No.: US 6,611,661 B2
(45) Date of Patent: Aug. 26, 2003

(54) SELF-LEVELING CAMERA

(75) Inventor: John S. Buck, Winnetka, CA (US)

(73) Assignee: Clean Line Incorporated, St. Paul, MN (US)

( * ) Notice: Subject to any disclaimer, the term of this patent is extended or adjusted under 35 U.S.C. 154(b) by 0 days.

(21) Appl. No.: 10/076,728

(22) Filed: Feb. 14, 2002

(65) Prior Publication Data

US 2002/0131781 A1 Sep. 19, 2002

Related U.S. Application Data

(60) Provisional application No. 60/268,565, filed on Feb. 14, 2001.

(51) Int. Cl.$^7$ .................................................. G03B 37/00
(52) U.S. Cl. ......................................................... 396/19
(58) Field of Search ............................ 396/19, 50, 420, 396/421, 427; 348/373, 374, 82–85, 143

(56) References Cited

U.S. PATENT DOCUMENTS

| 624,359 A | 5/1899 | Mayo |
| 1,312,283 A | 8/1919 | Stahlhuth |
| 3,675,549 A | 7/1972 | Adair ............................ 95/1.1 |
| 4,295,721 A | 10/1981 | Rebikoff ....................... 354/64 |
| 4,645,320 A * | 2/1987 | Muelling et al. ............ 396/419 |
| 4,713,697 A | 12/1987 | Gotou et al. ................. 358/222 |
| 4,855,838 A | 8/1989 | Jones et al. .................. 358/229 |
| 5,034,759 A | 7/1991 | Watson ......................... 354/67 |
| 5,107,286 A | 4/1992 | Sergeant et al. .............. 354/64 |
| 5,735,497 A * | 4/1998 | Haas et al. ............... 248/181.1 |
| 5,963,749 A | 10/1999 | Nicholson .................... 396/421 |
| 6,115,556 A | 9/2000 | Reddington ................. 396/267 |

* cited by examiner

Primary Examiner—David Gray
(74) Attorney, Agent, or Firm—Fredrikson & Byron, P.A.

(57) ABSTRACT

A mechanical self-leveling camera assembly for remote positioning from a deployment position is provided. The self-leveling camera assembly comprises a camera, a weight, a camera housing, and an elongate rod for deploying the camera assembly. The camera and weight are freely rotatable within the housing about an axis such that gravitational forces maintain the rotational orientation of the camera independent of the housing. A slip ring may be included for positioning between the camera housing and the camera, for receipt of, for example, ground, power, or video wires. The camera optionally includes a light-emitting diode ring especially useful for lighting near zero ambient light environments.

20 Claims, 5 Drawing Sheets

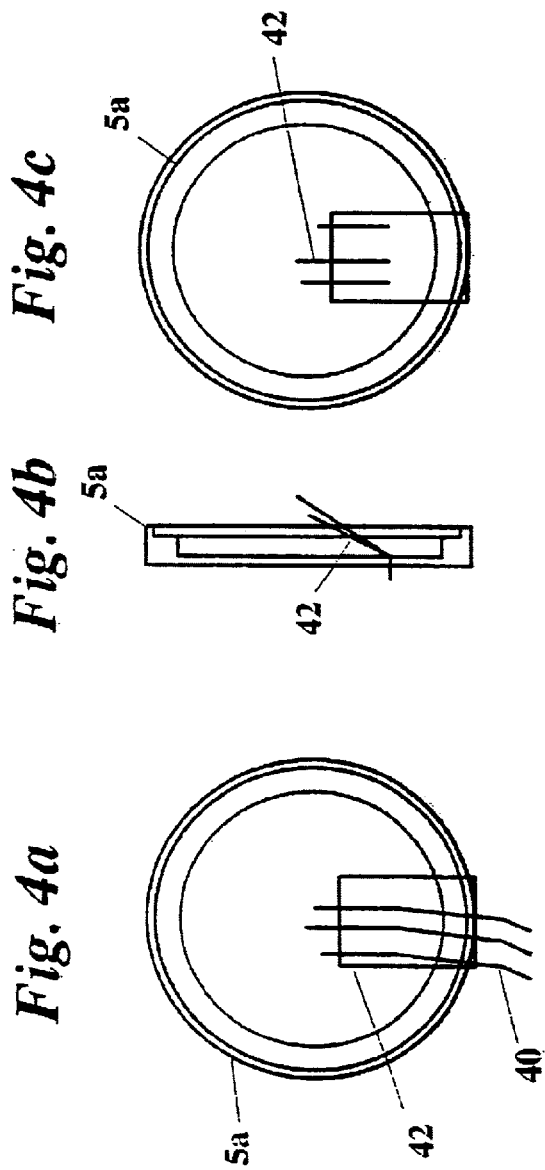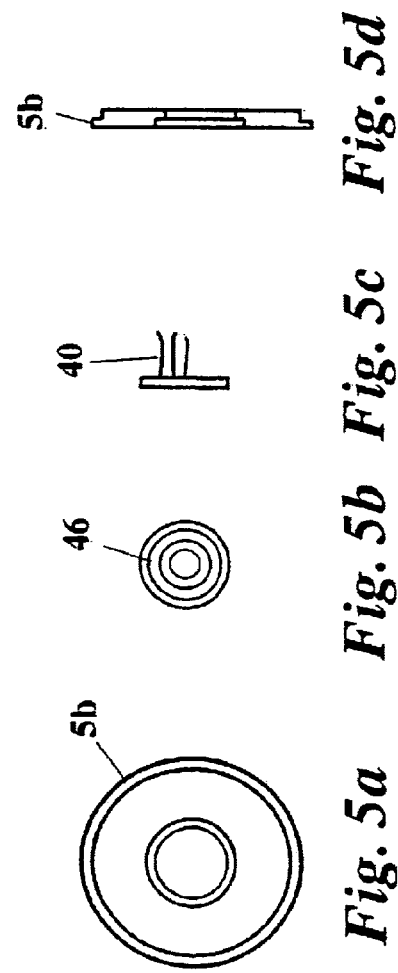

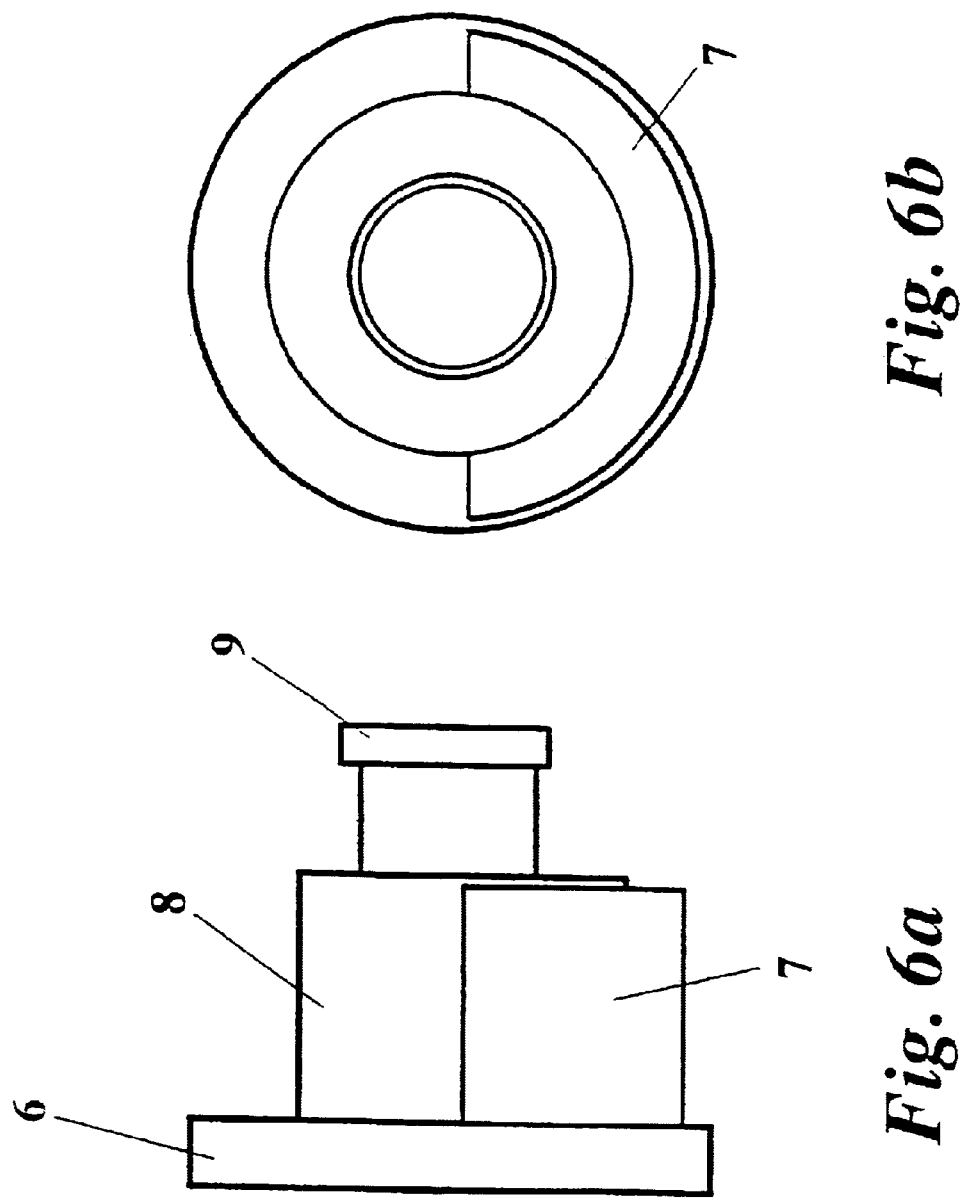

SELF-LEVELING CAMERA

This Appln claims benefit of Prov. No. 60/268,565 filed Feb. 14, 2001.

FIELD OF THE INVENTION

The present invention provides a mechanical self-leveling camera assembly especially useful for remote positioning from a deployment location.

BACKGROUND OF THE INVENTION

Push-rod cameras are frequently used for taking photographs in an environment that is generally inaccessible to a photographer. For example, push-rod cameras are often used for taking photographs in a sewer pipe. In a typical push-rod camera, the camera is lowered into the site where photography is desired on a cable from a reel. As the camera is lowered and more cable is fed in, the camera head slowly rotates, usually in the form of continual rotation. Of course, during use, the camera head is within the site and not accessible for manual manipulation. Thus, if the camera head becomes skewed or rotated, it is not possible to access and manually turn the camera head to the correct position. As a result, the pictures taken by a standard push-rod camera are often at skewed orientations. It is also noted that the almost continual rotation of the camera may cause connecting wires extending from the camera to become entangled.

Electronic signal processing of an image signal produced with a push-rod camera is often used to electronically "right" the image. Electronics components control the position, focus, and iris of the camera. Using the electronics components, the camera may be controlled and the video image viewed from a remote location. Cameras of this type can be costly, however, involving the costs of the electronics as well as the cable running from the camera site to the remote site.

Cameras have also been developed to level the camera, and thus right the image, without the use of electronics. For example, aerial cameras have used self-leveling mechanisms involving a system of suspension cables. Unfortunately, these suspension-system self-leveling mechanisms are not amenable to, for example, lowering in an enclosed area where 360 degrees of free rotation is desirable.

SUMMARY OF THE INVENTION

The present invention relates to a camera assembly, and more particularly, to a mechanical self-leveling camera assembly that maintains angular orientation when positioned remotely from a deployment location. In one embodiment, the self-leveling camera may be used to produce an image in angular orientation while the camera is suspended via cable into a sewer pipe.

The self-leveling camera assembly includes a camera, a leveling weight operably attached to the camera, a camera housing enclosing the camera and the weight, and an elongate rod attached to the housing for positioning the camera remotely from a deployment location. The weight and camera are freely rotatable within the housing about an axis, the leveling weight having a center of mass displaced from the axis such that gravitational forces maintain the rotational orientation of the camera independent of the orientation of the housing.

Thus, the present invention uses mechanical means to maintain the camera in an angular orientation. Further, it does so without requiring any wires or cables other than those typically used for standard-made remote deployment camera operation.

The self-leveling camera assembly may further include a bearing positioned between the camera body and the camera housing, where the camera includes a camera body and a camera lens. A slip ring is attached to the bearing, the slip ring being configured for receiving at least one wire, for example, a power, video, or ground wire, the at least one wire extending through the slip ring along the elongate rod.

A light source is provided with an embodiment of the self-leveling camera assembly such that the camera may be used in near zero-ambient light conditions where not even low-light cameras function properly. The light source may include a light-emitting diode ring received in a light window of the camera housing.

A further embodiment of the invention provides a self-leveling camera assembly kit for replacing the camera head, including the camera body and camera lens, of a camera. The self-leveling camera assembly kit is designed to maintain the angular orientation of the camera when the camera is positioned remotely from a deployment location. The self-leveling camera assembly kit includes a camera body, a camera lens, and a leveling weight. The camera body, camera lens and weight are freely rotatable within a camera housing about an axis, the leveling weight having a center of mass displaced from the axis such that gravitational forces maintain the rotational orientation of the camera body independent of the orientation of the housing. Thus, the owner of a standard-made camera or a camera without a self-leveling head or with a less than optimal self-leveling head may replace the camera head without replacing the entire camera.

BRIEF DESCRIPTION OF THE DRAWINGS

FIGS. 4a–4c are schematics of the rear half of the slip ring of an embodiment of the present invention;

FIGS. 5a–5d are schematics of the front half of the slip ring of an embodiment of the present invention;

FIGS. 6a and 6b are schematics of a portion of an embodiment of the present invention.

DETAILED DESCRIPTION OF THE PREFERRED EMBODIMENTS

While a preferred embodiment of the present invention has been described, it should be understood that various changes, adaptations and modifications may be made therein without departing from the spirit of the invention and the scope of the appended claims.

Figure 1:
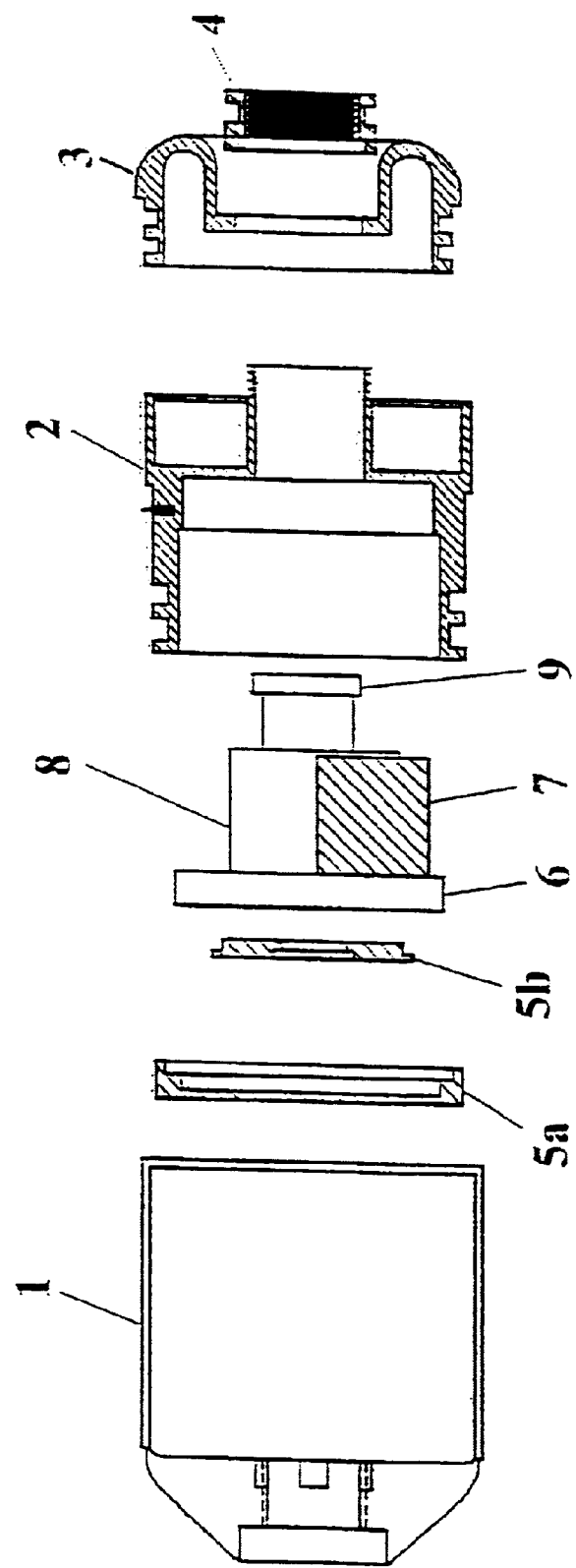
FIG. 1 is an exploded view of one embodiment of the invention.

FIG. 1 is an exploded view of a first embodiment of the present invention. As illustrated in FIG. 1, the self-leveling camera assembly uses mechanical means to maintain the camera in an angular orientation when the camera is positioned remotely from a deployment location. Thus, the self-leveling camera of the present invention may be used for deploying a camera into a sewer pipe and producing images in a desired angular orientation. The self-leveling camera assembly includes a camera, a camera housing, a mechanical self-leveling mechanism, and an elongate rod for positioning the camera remotely from the deployment location. The camera preferably includes a camera body 8 and a camera lens 9, the self-leveling camera being provided with a camera lens window 4. Preferably, the camera body is of a CCD type. The camera may further be provided with a light window 3, as will be discussed further in reference to FIG. 2. In a preferred embodiment, the mechanical self-leveling mechanism comprises a leveling weight 7 operably attached to the camera, optionally including a bearing 6 positioned between the camera and the camera housing. The bearing 6 is preferably a low-friction thin wall bearing. In accordance with the present invention, the camera may be regular-sized, miniature, or of any desired size.

The camera may be deployed into a place where photographing is desired using the elongate rod and/or by feeding a cable, with the camera attached thereto. Typically, as the camera is deployed, the camera slowly rotates With regards to the present invention, while the light window 3, window holder 4, camera body 8, and lens 9 rotate as the camera of the present invention is suspended, the bearing 6 and weight 7 remain stationary relative to gravity. Thus, the camera and weight rotate freely within the camera housing about an axis, the leveling weight having a center of mass displaced from the axis such that gravitational forces maintain the rotational orientation of the camera independent of the orientation of the housing. A slip ring, comprised of the rear half of the slip-ring 5a and the front half of the slip-ring 5b, attaches to the bearing 6 which in turn is attached to the housing 2. The bearing 6 holds the camera body 8 in position within the housing 2. The bearing selection is optimized for minimum friction and the weight geometry and material are designed to obtain optimum torquing force. The weight 7 may be manufactured of, for example, tungsten or lead. Wires may commute across the slip ring so that power, ground, and video signal connectors are maintained at all times. Further, by commuting wires through the slip-ring, the wires may extend to the camera and yet not become entangled.

Figure 2:
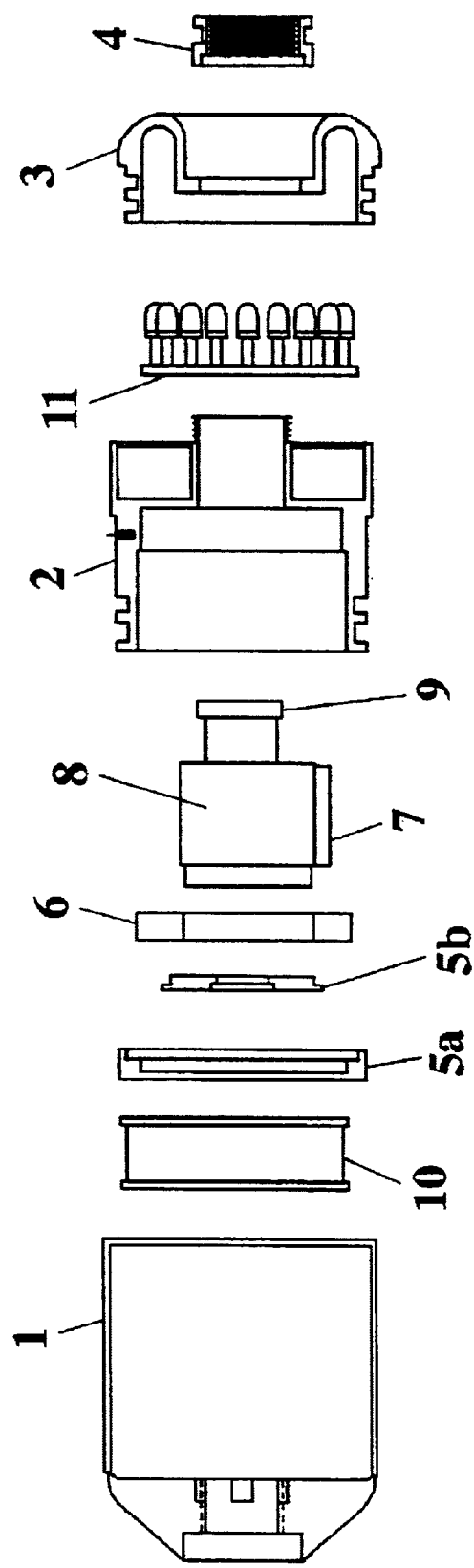
FIG. 2 is an exploded view of an embodiment of the invention having a ring of LED light.

As seen in FIG. 2, the self-leveling camera assembly may include a light-emitting diode (LED) ring 11 for illumination. The self-leveling camera assembly is suitable for use in near zero-ambient light conditions. For example, in a sewer pipe, where there is typically little to no ambient light. In zero-ambient light conditions, even low-light cameras generally do not function properly. The LED ring 11 is positioned such that light from the LED ring 11 is may transmit through the light window 3. The light window may be manufactured of a hard plastic. The self-leveling camera of the present invention, with LED ring 11, is a self-contained unit that illuminates the complete darkness of a sewer. Also shown in FIG. 2 is a transmitter coil 10 that may be used to communicate the camera's location. An additional lead wire serves to "turn on" the operation of coil 10. The transmitter coil 10 enables precise location of the position of the camera head. The lead wire may pass through the slip ring or may be alternately connected to the self-leveling camera.

Figure 3:
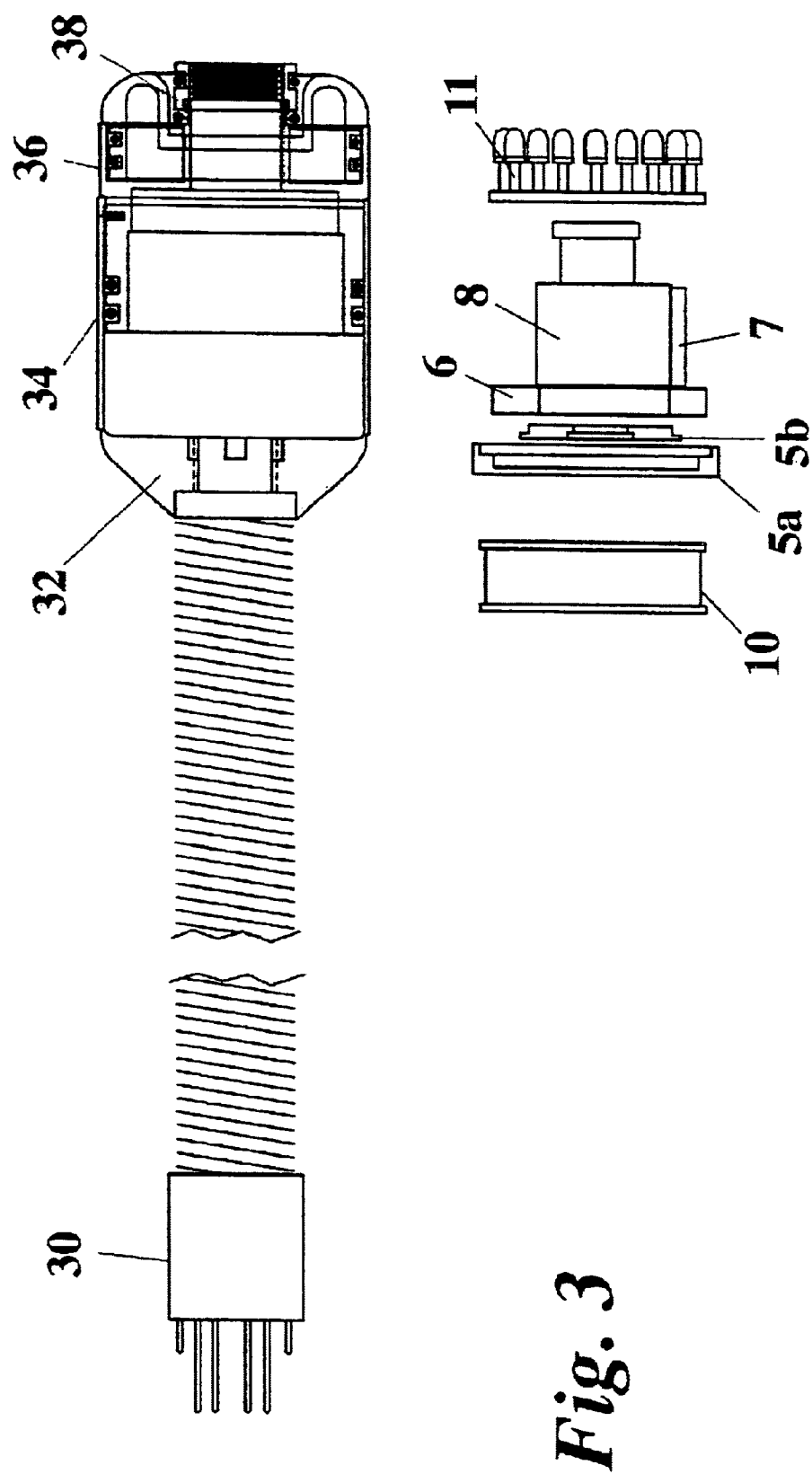
FIG. 3 is an exploded view of a hardened camera housing.

FIG. 3 shows a "hardened camera housing." While, in a preferred embodiment, the housing of the camera assembly is water-tight, it may be desirable to provide a more durable housing that is suitable for use in a severe environment. Desirably, such a durable housing would protect the camera from damage due to shock, chemicals, and the intrusion of liquids. The hardened camera housing is configured with an epoxy seal 30, a crimp seal 32, and dual O-ring seals 34, 36, and 38 to prevent breach of integrity of the camera housing.

Turning now to FIG. 4 and FIG. 5, rear and side views of the rear half and the front half of an embodiment of the slip ring used in the present invention may be seen. In a preferred embodiment, the slip ring comprises a rear half of the slip-ring 5a that fits on the outer race of the bearing 6 and a front half of the slip-ring 5b that fits on the inner race of the bearing 6. Referring particularly to FIG. 4a, rear wires 40 commute through the rear half of the slip ring 5a. Three flexible pins/contact electrodes 42, as seen in FIGS. 4a–4c, may be mounted on the rear half of the slip ring 5a to push gently against three circuit board traces 46 (see FIG. 5b) on the front half of the slip ring 5b to give continuity during rotation. Three wires 40 (see FIGS. 4a and 5c) extend from the three traces 46 to a circuit board of the camera. This arrangement gives relatively low mechanical resistances for the rubbing of the pins on the circuit boards and for the internal rotation of the bearing itself. Optionally, either the front or rear half of the slip ring may be gold plated for low electrical resistance.

FIG. 6 schematically illustrates the low-friction bearing 6, the leveling weight 7, the camera body 8, and the camera lens 9. The bearing 6 and leveling weight 7 remain stationary relative to gravity, thus aiding in preventing the camera from becoming skewed.

In a further embodiment, the self-leveling camera assembly as herein described is retro-fittable to other cameras having power, ground, and video cables. The self-leveling mechanism of the self-leveling camera assembly is self-contained in a replaceable camera head, comprising the camera body and camera lens, such that the self-leveling camera head may replace the camera head on an existing camera. Thus, the owner of a standard-made camera or a camera with a bad self-leveling head may replace the head without replacing the entire camera.

The self-leveling camera assembly may alternately be configured for further self-containment. Such a configuration involves little or no electrical wiring. Thus, in one embodiment, the camera is battery-operated and transmits a video signal wirelessly.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as encompassed by the scope of the appended claims.

What is claimed is:

1. A self-leveling camera assembly that maintains angular orientation when positioned remotely from a deployment location, the camera assembly comprising:

a camera;

a leveling weight operably attached to the camera;

a camera housing for enclosing the camera and the weight, the camera and weight together freely rotatable within the housing about an axis, the leveling weight having a center of mass displaced from the axis such that gravitational forces maintain the rotational orientation of the camera independent of the orientation of the housing; and an elongate rod attached to the housing adapted to position the camera remotely from the deployment location.

2. The self-leveling camera assembly of claim 1, wherein the camera comprises a camera body and a camera lens.

3. The self-leveling camera assembly of claim 2, and further including a camera lens window.

4. The self-leveling camera assembly of claim 1, wherein the leveling weight is tungsten.

5. The self-leveling camera assembly of claim 1, wherein the leveling weight is lead.

6. The self-leveling camera assembly of claim 1, and further including a slip ring positioned between the camera and the camera housing, the slip ring being configured for receiving at least one wire, the at least one wire extending through the slip ring along the elongate rod.

7. The self-leveling camera assembly of claim 6, wherein the slip ring further comprises a rear half and a front half.

8. The self-leveling camera assembly of claim 6, wherein the rear half of the slip ring fits on an outer race of the bearing and the front half of the slip ring fits on an inner race of the bearing.

9. The self-leveling camera assembly of claim 6, wherein the rear half of the slip ring comprises at least one contact electrode and the front half of the slip ring comprises at least one circuit board trace, the at least one contact electrode being configured for contact with the at least one circuit board trace.

10. The self-leveling camera assembly of claim 1, and further including a light window attachable to the camera housing.

11. The self-leveling camera assembly of claim 10, and further including a light-emitting diode ring configured for positioning such that light from the light-emitting diode ring is transmitted through the light window.

12. The self-leveling camera assembly of claim 1, and further including a transmitter coil, the transmitter coil being configured for enclosure by the camera housing.

13. The self-leveling camera assembly of claim 12, and further including a lead wire in communication with the transmitter coil for turning on the transmitter coil.

14. The self-leveling camera assembly of claim 13, and further including a slip ring attached to the bearing wherein the lead wire extends through the slip ring.

15. The self-leveling camera assembly of claim 1, wherein the slip ring receives power, ground, and video wires.

16. The self-leveling camera assembly of claim 1, wherein the camera housing is water-tight.

17. The self-leveling camera assembly of claim 1, wherein the camera housing is a hardened camera housing comprising an epoxy seal, a crimp seal, and dual O-ring seals.

18. The self-leveling camera assembly of claim 1, wherein the camera assembly is wireless.

19. A self-leveling camera assembly that maintains angular orientation when positioned remotely from a deployment location, the camera assembly comprising:
   a camera body;
   a camera lens;
   a leveling weight operably attached to the camera body;
   a camera housing for enclosing the camera body, the camera lens and the weight, the camera body, camera lens, and weight together freely rotatable within the housing about an axis, the leveling weight having a center of mass displaced from the axis such that gravitational forces maintain the rotational orientation of the camera independent of the orientation of the housing;
   a bearing positioned between the camera body and the camera housing;
   a slip ring attached to the bearing, the slip ring being configured for receiving at least one wire, the at least one wire extending through the slip ring along the elongate rod;
   a light source configured for receipt by the housing; and
   an elongate rod attached to the housing adapted to position the camera body remotely from the deployment location.

20. A self-leveling camera assembly kit for replacing the camera head of a camera, the self-leveling camera assembly kit maintaining angular orientation of the camera when positioned remotely from a deployment location, the self-leveling camera assembly kit comprising:
   a camera body;
   a camera lens;
   a leveling weight operably attached to the camera body, the camera body, camera lens and weight together freely rotatable within a camera housing about an axis, the leveling weight having a center of mass displaced from the axis such that gravitational forces maintain the rotational orientation of the camera body independent of the orientation of the housing.

* * * * *